United States Patent [19]

van der Weide

[11] Patent Number: 4,485,792
[45] Date of Patent: Dec. 4, 1984

[54] METHOD FOR SUPPLYING AN INTERNAL COMBUSTION ENGINE WITH LIQUEFIED PETROLEUM GAS AND APPARATUS FOR PERFORMING THE METHOD

[75] Inventor: Jouke van der Weide, Rijswijk, Netherlands

[73] Assignee: Robert Bosch GmbH, Stuttgart, Fed. Rep. of Germany

[21] Appl. No.: 420,971

[22] Filed: Sep. 21, 1982

[30] Foreign Application Priority Data

Jan. 14, 1982 [DE] Fed. Rep. of Germany ....... 3200864

[51] Int. Cl.$^3$ .................. F02B 43/00; F02M 21/04
[52] U.S. Cl. .................................. 123/527; 123/525; 123/452; 48/180 R; 48/189
[58] Field of Search ............... 123/525, 526, 527, 452; 48/189.2, 180.1

[56] References Cited

U.S. PATENT DOCUMENTS

| 2,821,843 | 2/1958 | Mengekamp et al. | 123/527 |
| 2,831,758 | 4/1958 | Warner et al. | 123/527 |
| 3,184,295 | 5/1965 | Baverstock | 123/525 |
| 4,391,254 | 7/1983 | Jäggle et al. | 123/452 |

FOREIGN PATENT DOCUMENTS 5407  1/1980  Japan .................... 123/452

Primary Examiner—Ethel R. Cross
Attorney, Agent, or Firm—Edwin E. Greigg

[57] ABSTRACT

A method for supplying an internal combustion engine with liquefied petroleum gas (LPG) and an apparatus for blowing LPG into the intake manifold of the engine. The apparatus includes an evaporator-pressure regulating valve, downstream of which a metering valve having a metering piston is provided. The metering piston is movable in a guide bore and opens a metering opening to a greater or lesser extent. The adjustment of the metering piston is effected in accordance with the quantity of air aspirated by the engine by means of an air flow rate meter, as a result of which a quantity of LPG corresponding to the aspirated air quantity can be metered. The pressure at the evaporator-pressure regulating valve is variable via a control pressure line by means of a pneumatic control medium via a pressure control valve in such a manner that it is possible to regulate a mixture adapted to operating parameters of the engine. For instance, a rich mixture can be produced during warmup, acceleration and full load, while a lean mixture is produced at partial load.

12 Claims, 1 Drawing Figure

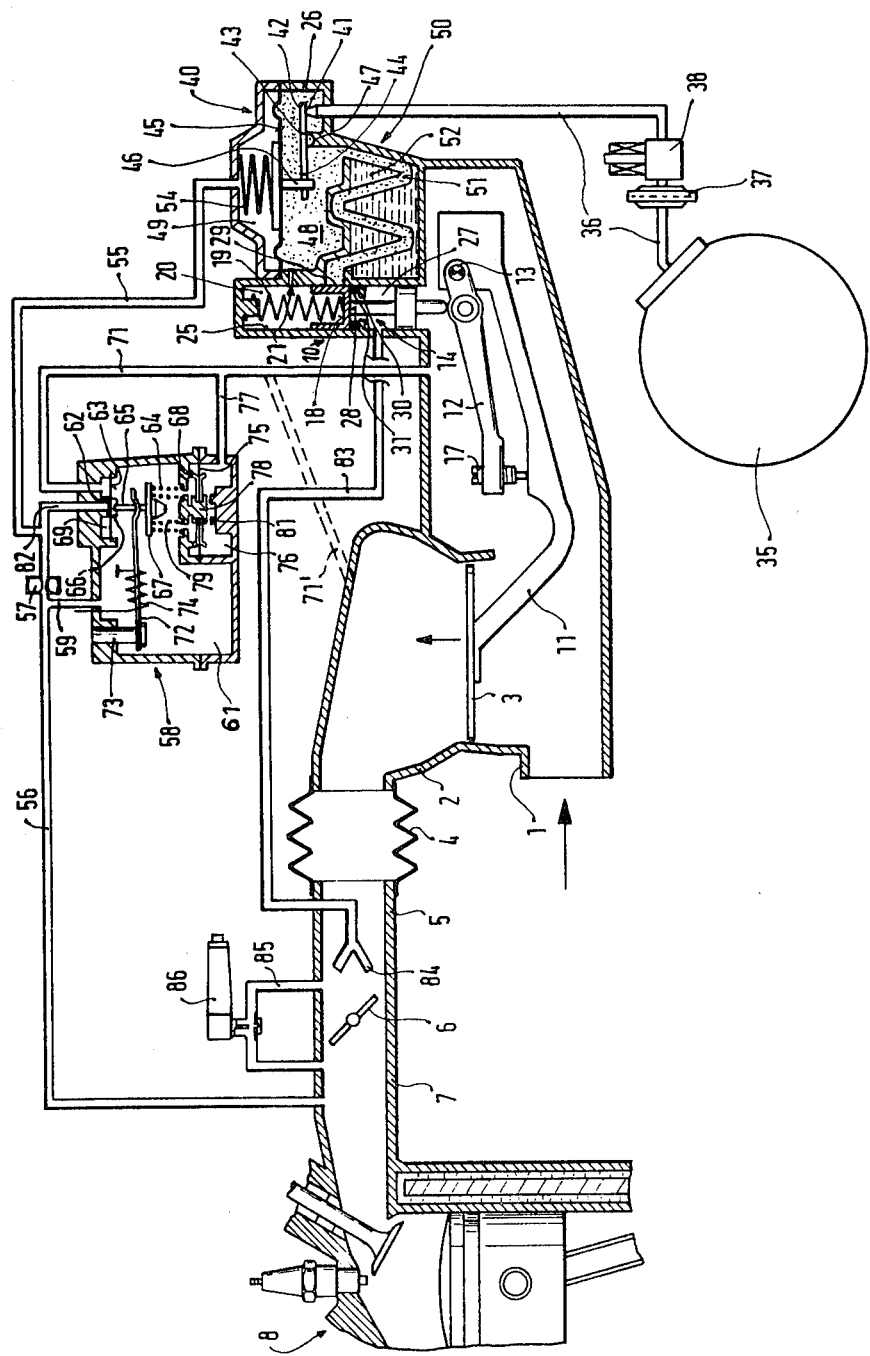

METHOD FOR SUPPLYING AN INTERNAL COMBUSTION ENGINE WITH LIQUEFIED PETROLEUM GAS AND APPARATUS FOR PERFORMING THE METHOD

CROSS-REFERENCE TO RELATED APPLICATION

This application discloses subject matter generally related to the subject matter disclosed in my co-pending application Ser. No. 420,972 filed Sept. 21, 1982, both applications being commonly assigned.

BACKGROUND OF THE INVENTION

The present invention relates to a method and apparatus for supplying LPG as fuel to an internal combustion engine.

An apparatus for blowing in liquefied petroleum gas (LPG) is already known, in which a metering of the evaporated LPG is effected in accordance with the air throughput in the intake manifold by means of a pressure measurement in a venturi. The pressure in the venturi varies with the square of the flow velocity, so that it is not possible to effect the desired metering of a quantity of LPG in a linear ratio to the aspirated air quantity. Furthermore, with the known apparatus it is possible to make only a rough adaptation of the LPG-air mixture to the various operating states of the internal combustion engine, which causes an increased consumption of LPG, reduced power and unfavorable exhaust gases.

OBJECT AND SUMMARY OF THE INVENTION

It is an object of the present invention to provide a method for supplying an internal combustion engine with LPG according to which the pressure of the LPG is utilized in controlling its flow, and to a corresponding apparatus for supplying the LPG to the engine that is not subject to the disadvantages noted above.

According to the method aspect of the present invention, the pressure of the LPG is utilized against the pressure of a pneumatic control medium, which is derived from the intake manifold of the engine downstream of a throttle valve situated in the intake manifold, to control the flow of LPG to a metering valve. The pressure of the pneumatic control medium is varied by superimposing a higher pressure as a function of operating parameters of the engine. The apparatus for supplying the fuel in accordance with the above noted method includes an evaporator-pressure regulating valve having a movable valve element to control the LPG flow. One side of the yielding wall is subjected to the pressure of evaporated LPG and the other side is subjected to the force of a compression spring and to the pressure of the pneumatic control medium. The pressure of the pneumatic control medium is varied by the pressure in the intake manifold downstream of the throttle valve.

The method and apparatus according to the present invention have the advantage over the prior art that the ratio between the metered quantity of LPG and the aspirated air quantity is variable in accordance with operating parameters of the engine, so that the highest possible output is attained with the least possible consumption of LPG and low toxic exhaust emissions.

It is particularly advantageous to enrich the LPG-air mixture during warmup and full load of the engine and to lean down the mixture at partial loads.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing illustrates an exemplary embodiment of the invention which is described in detail below.

DESCRIPTION OF THE PREFERRED EMBODIMENT

In the injection system for LPG shown in the drawing, the air required for combustion flows in the direction of the arrow downstream of an air filter (not shown) via an intake manifold section 1 into a conical section 2, in which an air flow rate meter 3 is disposed. From the conical section 2 the air flows through an elastically deformable section 4 and a section 5 via a throttle valve 6 to an intake manifold section 7, and from there to one or more cylinders 8 of the internal combustion engine. By way of example, this engine may be a mixture-compressing internal combustion engine having externally supplied ignition or a self-igniting internal combustion engine. The air flow rate meter 3 comprises a baffle valve 3, for example, disposed transversely with respect to the air flow direction. By further way of example, the baffle valve 3 moves within the conical section 2 of the intake manifold in accordance with an approximately linear function of the air quantity flowing through the intake manifold. Because of a constant restoring force engaging the air flow rate meter 3 and a constant air pressure prevailing upstream of the air flow rate meter 3, the pressure prevailing between the air flow rate meter 3 and the throttle valve 6 likewise remains constant.

The air flow rate meter 3 controls a metering valve 10. A pivot lever 11 connected with the air flow rate meter 3 serves to transmit the adjusting movement of the air flow rate meter. In common with a correcting lever 12, the pivot lever 11 is supported on a pivot pin 13 and upon its pivoting movement actuates a movable valve element, embodied as a metering piston 14, of the metering valve. The desired fuel-air mixture can be corrected by a mixture regulating screw 17 located between the pivot lever 11 and the correction lever 12. A restoring spring 19 engages the end 18 of the metering piston 14 remote from the pivot lever 11 and tends to pivot the air flow rate meter 3, via the metering piston 14, into its initial position, in which, when the engine is not operating, it virtually completely closes the cross section of the intake manifold. The restoring spring 19 is disposed in a spring chamber 20, which is ventilated, preferably via a throttling intersecting passage 21, toward an evaporating chamber 48.

The metering piston 14 is supported in a slidable manner in a guide bore 25 of the metering and evaporation housing 26 and is provided with an annular groove 27. Remote from the pivot lever 11, the annular groove 27 is limited by an axial limiting surface 28, which upon an axial movement of the metering piston 14 opens a metering opening 29 to a greater or lesser extent toward the annular groove 27. The metering opening 29 is embodied in the wall of the guide bore 25 and is by way of example in the form of a slit. An annular shoulder 30 of the guide bore 25 protrudes into the annular groove 27, and a sealing ring 31 rests on the annular shoulder remote from the limiting surface 28. When air is not flowing, that is, in the case where the engine is shut off, the limiting surface 28 of the metering piston 14 is pressed in a sealing manner against this sealing ring 31 by the restoring spring 19.

The supply of fuel to the injection system is effected from an LPG tank 35, which is embodied as a pressure container of specialized construction and which, when filled, receives LPG at a pressure of approximately 15 to 20 bar. A supply line 36 leads via a filter 37 and a blocking valve 38, which when the system is shut off interrupts the supply line 36, to an evaporator-pressure regulating valve 40. The supply line 36 terminates in a regulating nozzle 41 in the evaporator-pressure regulating valve 40. A two-armed lever 43 cooperates with the regulating nozzle 41. One end 42 of the level 43 serves, for example, as a movable valve element and cooperates with the regulating nozzle 41 in such a manner that the discharge cross section of the regulating nozzle is opened to a greater or lesser extent. The other end 44 of the lever 43 is engaged, via an actuation pin 46, with an evaporator diaphragm 45 provided in the form of a yielding wall in the evaporator-pressure regulating valve 40. The lever 43 is pivotable about a support point 47. The evaporator diaphragm 45 separates an evaporator chamber 48 from a control chamber 49. The evaporator chamber 48 receives the regulating nozzle 41, the lever 43 and the LPG exiting from the regulating nozzle 41. In the evaporator chamber 48, the LPG both evaporates and is decompressed to a predetermined pressure and is capable of flowing to the metering opening 29 via a feeder line 51 leading through a heat exchanger 50. The coolant 52 of the engine, by way of example, may flow through the heat exchanger 50.

A compression spring 54 is disposed in the control chamber 49 of the evaporator-pressure regulating valve 40 and is supported on the evaporator diaphragm 45 in such a manner that it tends to raise the end 42 of the lever 43 from the regulating nozzle 41, thus permitting a greater quantity of LPG to leave the nozzle. A control pressure line 55 leads from the control chamber 49 of the evaporator-pressure regulating valve 40 to a vacuum line 56, which communicates with the intake manifold section 7 downstream of the throttle valve 6 and has a throttle restriction 57. The air pressure in the control pressure line 55 can be varied by means of a pressure control valve 58. The pressure control valve 58 serves to effect a desired adaptation of the mixture to operating conditions, for instance leaning down the LPG-air mixture in the partial-load range. It is also capable of serving to enrich the mixture during the warmup phase, during acceleration and at full load of the engine. To this end, a partial line 59 branches off from the vacuum line 56 prior to the throttle restriction 57, discharging into a vacuuum chamber 61 of the pressure control valve 58 shown by way of example. The pressure control valve 58 is embodied as a flat seat valve, having a fixed valve seat 62 and a valve diaphragm 68, which is urged in the closing direction of the pressure control valve 58 by a valve spring 64, among other elements. The valve spring 64 acts upon the valve diaphragm 63 via a valve pin 65, which is disposed between an abutment 66 engaging the valve diaphragm 63 and a spring plate 67, which the valve spring 64 engages on its other end. The valve spring 64 is supported on its other end, remote from the spring plate 67, on a contact 68. The valve diaphragm 63 divides the vacuum chamber 61 from a high-pressure chamber 69 into which the valve seat 62 protrudes. The high-pressure chamber 69 communicates via a high-pressure line 71 with the intake manifold section 1 upstream of the air flow rate meter 3. However, it may also communicate with the intake manifold section 2, 4, 5 directly downstream of the air flow rate meter 3, as indicated by dashed lines at 71' in the drawing. At temperatures below the engine operating temperature of ca. 80° C., the closing force transmitted by the valve pin 65 onto the pressure control valve 58 can act counter to a bimetallic spring 72, which at one end rests on the spring plate 67 during the warmup phase and the other end of which is secured to a bolt 73 pressed into the housing of the pressure control valve 58. An electrical heating element 74 may be mounted on the bimetallic spring 72 and supplied with current from the engine ignition. The pressure control valve 58 further has a control diaphragm 75, which divides the vacuum chamber 61 from a pressure chamber 76. The pressure chamber 76 communicates via a pressure line 77 with the high-pressure line 71 or 71'. A spring plate 78 engages the control diaphragm 75, and a control spring 79 which extends parallel to the valve spring 64 is supported at one end on the spring plate 78 and at the other end engages the spring plate 67. The movement of the control diaphram 75 is limitable because of the fact that the spring plate 78 can come to rest, in one direction of movement, on the contact 68 and on a stop 81 in the opposite direction. A correction line 82 leads from the fixed valve seat 62 to the control pressure line 55 or via the throttle restriction 57 to the vacuum line 56.

In place of the pressure control valve 58 shown, it is also possible for another pressure control valve to be provided, for instance one which is actuatable electromagnetically and which in order to adapt the mixture varies the air pressure in the control pressure line 55 in accordance with operating parameters such as temperature, rpm, throttle valve position, exhaust gas composition and others, all of which are converted into electrical signals.

The mode of operation of the system is as follows:

When the engine is started, the blocking valve 38 is opened and the LPG flows via the supply line 36 to the regulating nozzle 41 of the evaporator-pressure regulating valve 40, by means of which a pressure of the evaporated LPG which is constant yet is variable in accordance with engine operating parameters can be regulated. The LPG evaporated in the evaporator chamber 48 flows through the heat exchanger 50 via the feeder line 51 and is cooled by means of the coolant, which is still at a low temperature and from which the required heat of evaporation is drawn. The gas accordingly has a higher density than at the end of the warmup phase of the engine, when the coolant is warmer. This higher density causes a larger metered quantity of gas at the metering valve 10 and thus produces an enrichment of the mixture supplied to the engine.

Upon starting, the engine aspirates air via the intake manifold 1, and the flow rate meter 3 accordingly undergoes a certain deflection out of its position of rest. In accordance with the deflection of the flow rate meter 3, the metering piston 14 is displaced as well, via the lever 11. In accordance with the position of the metering piston 14, the limiting surface 28 of the metering piston 14 opens the metering opening 29 to a greater or lesser extent toward the annular groove 27, so that a quantity of gas is metered at the metering valve 10 which is dependent on the quantity of aspirated air ascertained by the air flow rate meter 3. This quantity of gas is carried to the intake manifold section 5, by way of example, via an injection line 83 communicating with the annular groove 27 of the metering piston 14, and is blown into the intake manifold section 5 via one or more nozzles 84 upstream of the throttle valve 6. For controlling a larger gas quantity during the warmup of the engine, a bypass 85 around the throttle valve 6 is provided on the intake manifold 5, 7. The cross section of this bypass 85 is controlled in accordance with temperature in a known manner using a supplementary mixture valve 86.

The direct connection between the air flow rate meter 3 and the metering piston 14 effects a predetermined ratio between the aspirated air quantity and the metered gas quantity. In order to attain further enrichment of the gas-air mixture supplied to the engine during the warmup phase, a relatively high pressure can be effected in the control chamber 49 of the evaporator-pressure regulating valve 40 by means of the pressure control valve 58. By opening the evaporator-pressure regulating valve 40 to a greater extent, a higher pressure of the evaporated LPG can thereby be produced at the metering opening 29. As a result, and because of the greater pressure drop through the metering valve 10, a larger gas quantity is accordingly metered and blown in via the nozzle 84. To this end, the bimetallic spring 72 engages the spring plate 67 of the pressure control valve 58 during the warmup phase of the engine in such a manner that the valve spring 64 and the control spring 79 are relieved, and the valve diaphragm 63 lifts up from the valve seat 62 to such an extent that via the correction line 82 the air pressure prevailing in the high-pressure line 71, 71' decreases the vacuum prevailing via the vacuum line 56 in the control pressure line 55. As a consequence, an increased pressure prevails in the control chamber 49 of the evaporator-pressure regulating valve 40, and the evaporator-pressure regulating valve 40 opens to a greater extent.

After the warmup phase of the engine has elapsed or after the bimetallic spring 72 has been heated by the electrical heating element 74, the bimetallic spring 72 bends away from the spring plate 67 and becomes disengaged from the spring plate 67, so that the spring forces of the valve spring 64 and the control spring 79 become fully effective; the result is that the valve diaphragm 63 closes the valve seat 62 to a greater extent, in accordance with the prevailing intake manifold pressures. With the valve seat 62 in a more fully closed position because of the valve diaphragm 63, the vacuum of the intake manifold 7 downstream of the throttle valve 6 becomes effective to a greater extent via the vacuum line 56 in the control pressure line 55. The result is that the pressure of the pneumatic control medium in the control chamber 49 is likewise reduced, and the evaporator-pressure regulating valve 40 closes more fully. In other words, it produces a lower pressure on the part of the evaporated LPG upstream of the metering opening 29, which causes a leaning of the mixture delivered to the engine. A leaning of the mixture of this kind is desirable when the engine is operating in the partial-load range. In the partial-load range of the engine, the vacuum in the intake manifold section 7 and thus via the vacuum line 56 and the partial line 59 in the vacuum chamber 61 of the pressure control valve 58 is so great that the pressure force of the pressure in the pressure chamber 76 suffices to cause the control diaphragm 75 to rest on the contact 68 counter to the force of the control spring 79. If the vacuum now drops at full load, or if the absolute pressure in the intake manifold 7 downstream of the throttle valve 6 increases at full load, then a higher absolute pressure also becomes effective in the vacuum chamber 61 via the vacuum line 56. This higher pressure, engaging the control diaphragm 75, moves it toward the stop 81, as a result of which the control spring 79 is relieved and the valve diaphragm 63 opens the valve seat 62 to a greater extent. The pressure prevailing in the high-pressure line 71, 71' thus becomes effective to an amplified extent in the pressure line 55 and in the control chamber 49. This in turn leads to an enrichment of the mixture because of the regulation of a greater gas pressure in the evaporator chamber 48 and thus a greater pressure drop at the metering opening 29. In the same manner, if there is an abrupt acceleration of the engine, an abrupt opening of the throttle valve 6 produces an increase of pressure in the vacuum line 56, which as at full load results in an enrichment of the mixture.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for supplying an internal combustion engine with LPG by means of an apparatus including the intake manifold of the engine and the throttle valve mounted therein, and an evaporator-pressure regulating valve, said evaporator-pressure regulating valve having: yielding wall means; a movable valve element movable by the yielding wall means; and a compression spring, the method comprising the steps of:
   applying said LPG under pressure to one side of said yielding wall means and applying the force of said compression spring and the pressure of a pneumatic control medium to the other side of said yielding wall means;
   deriving the pressure of the pneumatic control medium applied to the other side of said yielding wall from the intake manifold of the engine downstream of the throttle valve; and
   varying the pressure of the pneumatic control medium by superimposing a higher pressure as a function of operating parameters of the engine onto said pressure of the pneumatic control medium.

2. The method as defined in claim 1, wherein the pressure variation of the pneumatic control medium is lower during operation of the engine in the partial-load range than during operation of the engine at full-load, resulting in a leaner mixture during partial-load operation.

3. The method as defined in claim 2, wherein the pressure variation of the pneumatic control medium is high during engine warm-up, resulting in a rich mixture during warm-up operation.

4. The method as defined in claim 1, wherein the higher pressure superimposed on the pressure of the pneumatic control medium is derived from the intake manifold of the engine upstream of the throttle valve.

5. An apparatus for supplying LPG to an internal combustion engine comprising an intake manifold and a throttle valve mounted therein in which the LPG is blown into the intake manifold which comprises;

- a control pressure line;
- a vacuum line connected to the intake manifold downstream of the throttle valve, and to the control pressure line, said vacuum line including a throttle restriction;
- a pressure control valve;
- a high-pressure line connected to the control pressure line and the vacuum line via the pressure control valve as a function of operating parameters of the engine; and
- an evaporator-pressure regulating valve having a compression spring, a movable valve element and a yielding wall which actuates the movable valve element, wherein one side of the yielding wall is subjected to the pressure of evaporated LPG and the other side of said yielding wall is subjected to the force of the compression spring and, via the control pressure line, to the pressure of a pneumatic control medium, and wherein the pressure of the pneumatic control medium is varied by the pressure in the intake manifold downstream of the throttle valve.

6. The apparatus as defined in claim 5, further wherein the high-pressure line branches off from the intake manifold upstream of the throttle valve.

7. The apparatus as defined in claim 6, further comprising:

- a connecting line connected to the control pressure line, the vacuum line and the pressure control valve, further wherein said pressure control valve defines a high-pressure chamber and a vacuum chamber and includes: a valve diaphragm which divides the high-pressure chamber from the vacuum chamber, said high-pressure chamber being connected to the high-pressure line, and said vacuum chamber being connected to the vacuum line; means protruding into the high-pressure chamber and defining a valve seat, said means defining a valve seat being connected to said connecting line; a valve spring and a control spring disposed in the vacuum chamber and engaging said valve diaphragm to bias said valve diaphragm toward the valve seat; and a control diaphragm, one side of which is subjected to the force of the control spring, and the other side of which is subjected to the pressure in the high-pressure line.

8. The apparatus as defined in claim 7, further comprising:

- a bimetallic spring, further wherein the biasing force exerted by the valve spring and the control spring against the valve diaphragm is reduceable by the bimetallic spring at temperatures below the engine operating temperature.

9. The apparatus as defined in claim 8, further comprising:

- means for heating the bimetallic spring electrically.

10. The apparatus as defined in claim 7, further comprising:

- stop means, further wherein the movement of the control diaphragm is limited by said stop means.

11. The apparatus as defined in claims 5, 6, 7, 8, 9 or 10, further comprising:

- an air flow rate meter disposed in the intake manifold; and
- a metering valve disposed downstream of the evaporator-pressure regulating valve, said metering valve defining a metering opening and having: a metering piston and a restoring spring, said metering piston being actuatable by said air flow rate meter counter to the force of the restoring spring, for controlling the opening of the metering opening and the quantity of LPG metered as a function of the air quantity aspirated into and through the intake manifold.

12. The apparatus as defined in claim 5, further wherein the evaporator-pressure regulating valve has a heat exchanger therein through which the LPG flows, the LPG being cooled in said heat exchanger by engine coolant.

* * * * *